US012693845B2

(12) United States Patent
Povilus et al.

(10) Patent No.: US 12,693,845 B2
(45) Date of Patent: Jul. 28, 2026

(54) APPLICATION OF DATA DESCRIPTOR MAPS IN MANAGEMENT OF FIRMWARE CONTROL DATA

(71) Applicant: SK Hynix NAND Product Solutions Corp., Rancho Cordova, CA (US)

(72) Inventors: Sam Povilus, Boulder, CO (US); Cody Dinges, Longmont, CO (US); Karl Heichelheim, Longmont, CO (US)

(73) Assignee: SK Hynix NAND Product Solutions Corp., Rancho Cordova, CA (US)

( * ) Notice: Subject to any disclaimer, the term of this patent is extended or adjusted under 35 U.S.C. 154(b) by 97 days.

(21) Appl. No.: 18/388,779

(22) Filed: Nov. 10, 2023

(65) Prior Publication Data

US 2025/0156170 A1     May 15, 2025

(51) Int. Cl.
*G06F 8/65* (2018.01)
*G06F 8/71* (2018.01)
(52) U.S. Cl.
CPC . *G06F 8/65* (2013.01); *G06F 8/71* (2013.01)
(58) Field of Classification Search
CPC ........................................................ G06F 8/65
See application file for complete search history.

(56) References Cited

U.S. PATENT DOCUMENTS 6,205,526 B1     3/2001   Tanuma
2008/0270454 A1*  10/2008  Davis ................... G06F 9/5016
                                          707/999.102
2014/0201727 A1    7/2014  Asselin et al.
2016/0291986 A1*  10/2016  Warkentin ............ G06F 9/4411
2017/0337064 A1   11/2017  Vidyadhara et al.
2024/0012633 A1*   1/2024  Feng .................... G06F 21/602

FOREIGN PATENT DOCUMENTS

CN            113377793  A      9/2021
WO      WO2022010470 A1      1/2022

OTHER PUBLICATIONS

SK Hynix NAND Product Solutions Corp. (dba Solidigm), PCT/US2024/054988, International Search Report and Written Opinion, Feb. 21, 2025, 9 pgs.

* cited by examiner

*Primary Examiner* — Jae U Jeon
(74) *Attorney, Agent, or Firm* — Morgan, Lewis & Bockius LLP

(57)          ABSTRACT

This application is directed to managing firmware control data stored in a memory device of an electronic device. The electronic device obtains a current data descriptor map (DDM) corresponding to a current version of a firmware program, and identifies, in the memory device, a prior DDM and a prior control data structure corresponding to a prior version of the firmware program. Each of the prior and current DDMs maps a plurality of data descriptors to a plurality of locations in a respective control data structure. The prior control data structure stores a plurality of prior control data items identified by a plurality of prior data descriptors. A current control data structure is automatically generated for the current version of the firmware program based on the prior control data structure, the current DDM, and the prior DDM, and stores a plurality of current control data items identified by the data descriptors.

20 Claims, 8 Drawing Sheets

200

Host 220

DRAM Buffer — 228B

Memory Device (e.g., SSDs 112) 200

DRAM Buffer — 228A

202

Controller

Registers — 232

Integrity Engine — 230

SRAM Buffer — 224

Host Interface Controller — 222

Local Memory Processor — 218

DRAM Controller — 226

214A

Channel Controller 0

Channel Controller 1 — 214B

......

Channel Controller N — 214N

214N

204A — Channel 0  206A

208

210

206B

204B — Channel 1

......

204N — Channel N

216A

216B

......

216N 204A, 204B, and 204N: collectively 204
206A and 206B: collectively 206
214A, 214B, and 214N: collectively 214
216A, 216B, and 216N: collectively 216

Figure 2

| Data Descriptor | Location | Shift | Reference | Relative Location | Size | Data Type |
|---|---|---|---|---|---|---|
| Control Data Item 1 | | | | | | |
| Control Data Item 2 | | | | | | |
| ...... | | | | | | |
| ...... | | | | | | |
| Control Data Item N | | | | | | |

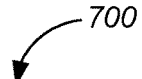

700

Obtain a current data descriptor map (DDM) corresponding to a current version of a firmware program — 702

The current DDM maps a plurality of current data descriptors to a plurality of current locations in a current control data structure — 704

Identify, in the memory device, a prior DDM and a prior control data structure corresponding to a prior version of the firmware program — 706

The prior DDM maps a plurality of prior data descriptors to a plurality of prior locations in the prior control data structure — 708

The prior control data structure stores a plurality of prior control data items identified by the plurality of prior data descriptors — 710

Automatically generate the current control data structure corresponding to the current version of the firmware program based on the prior control data structure, the current DDM, and the prior DDM — 712

The current control data structure stores a plurality of current control data items identified by the plurality of current data descriptors — 714

Store the current control data structure in the memory device — 716

Implement the current version of the firmware program on the electronic device using the plurality of current control data items stored in the current control data structure — 718

Figure 7

APPLICATION OF DATA DESCRIPTOR MAPS IN MANAGEMENT OF FIRMWARE CONTROL DATA

TECHNICAL FIELD

This application relates generally to memory management including, but not limited to, methods, systems, and non-transitory computer-readable media for managing firmware control data in a memory device of an electronic device.

BACKGROUND

Memory is applied in a computer system to store instructions and data. Particularly, the computer system relies on non-volatile memory to keep instructions and data stored thereon if the computer system is decoupled from a power source. Examples of the secondary memory include, but are not limited to, hard disk drives (HDDs) and solid-state drives (SSDs). Most embedded firmware architectures rely on hundreds of non-volatile control data structures on boot for initialization of firmware and hardware policies and states, as well as restoration of user-configured capabilities and telemetry logs. These data structures are saved as raw payloads in the non-volatile memory and restored across power loss events or firmware upgrades or downgrades. For product maintenance and differentiation, it is expected that firmware capabilities be added in subsequent releases for bug fixes, internal features, and customer-requested logs/ features. These changes may result in necessary changes to structures of non-volatile files the firmware relies on. Changes to non-volatile control data structures between releases can lead to incompatibilities between firmware versions. Careful engineering precautions must be taken when designing, modifying, or interacting with non-volatile structures across releases to ensure both copies of firmware can interpret contents of the raw files and handle their deltas. Incorrect firmware interpretation or handling of a file without fault may result in unexpected device behavior or corrupted telemetry logs at best, and critical hardware, firmware policy, or device failure at worst.

To mitigate the risk of incompatibilities, vendors incur a cost of engineering design meetings, debug sessions, and education when considering non-volatile data structures. Moreover, many vendors employ extensive validation resources to develop and execute complex compatibility tests considering hundreds of files and edge cases. Manual version of control data structure labeling is expensive and prone to human error. Any misstep in mitigations prior to release will likely result in compatibility escapes. With hundreds of items that need to be versioned, the probability of the wrong structure being versioned, the incorrect version being used, or a change being implemented without a version change is very high. Additionally most firmware releases have multiple version numbers both for different parts of the program (main, bootloader, API, etc.) and for different internal and external customers, which exact version number the control data applies to can quickly become confusing. Outside of security compatibility concerns, customers expect all firmware releases to be compatible with one another without issue or special upgrade or downgrade process. Ultimately a product malfunction or failure due to release incompatibility will significantly impact end-user revenue (due to release delays and/or downtime), tarnish a vendor's reputation, and result in lost vendor revenue. It would be beneficial to manage versions of firmware control data stored in a memory device in an accurate and efficient manner.

SUMMARY

Various embodiments of this application are directed to methods, systems, devices, and non-transitory computer-readable media for managing firmware control data (e.g., different versions of firmware) stored in a memory device of an electronic system. The firmware that controls an electronic device includes control logic and control data, and the control logic reads and writes the control data to maintain a state of the electronic device and its operation. In some embodiments, the firmware on an electronic device is updated more than once (e.g., periodically throughout the electronic device's lifecycle). In some situations, only the control logic is updated, and in some situations, both the control logic and the control data are updated. The control data optionally persists across two or more different versions of the control logic. When this occurs, the control logic in a first version of the firmware automatically points to a subset of control data that changes a location in the control logic in a second version of the firmware. Specifically, a data descriptor map (DDM) is applied with each firmware version to map a plurality of data descriptors to a plurality of data locations in a corresponding control data structure. Checkpoints are introduced to compare the data descriptors automatically between versions to allow automatic detection and upgrade/downgrade of the control data. By these means, the control data of the firmware is efficiently and accurately managed based on the DDMs as the firmware is updated among different versions.

In one aspect, a method is implemented at an electronic device including a memory device. The method includes obtaining a current data descriptor map (DDM) corresponding to a current version of a firmware program, and the current DDM maps a plurality of current data descriptors to a plurality of current locations in a current control data structure. The method includes identifying, in the memory device, a prior DDM and a prior control data structure corresponding to a prior version of the firmware program. The prior DDM maps a plurality of prior data descriptors to a plurality of prior locations in the prior control data structure, and the prior control data structure stores a plurality of prior control data items identified by the plurality of prior data descriptors. The method further includes automatically generating the current control data structure corresponding to the current version of the firmware program based on the prior control data structure, the current DDM, and the prior DDM. The current control data structure stores a plurality of current control data items identified by the plurality of current data descriptors. The method further includes storing the current control data structure in the memory device.

Some implementations of this application include an electronic device that includes one or more processors and memory having instructions stored thereon, which when executed by the one or more processors cause the processors to perform any of the above methods on a memory device (e.g., including one or more SSDs).

Some implementations of this application include a memory device that includes a plurality of memory devices (e.g., including one or more SSDs) and memory having instructions stored thereon, which when executed by the one or more processors cause the processors to perform any of the above methods on the memory device.

Some implementations include a non-transitory computer readable storage medium storing one or more programs. The one or more programs include instructions, which when executed by one or more processors cause the processors to implement any of the above methods on a memory device (e.g., including one or more SSDs).

These illustrative embodiments and implementations are mentioned not to limit or define the disclosure, but to provide examples to aid understanding thereof. Additional embodiments are discussed in the Detailed Description, and further description is provided there.

BRIEF DESCRIPTION OF THE DRAWINGS

For a better understanding of the various described implementations, reference should be made to the Detailed Description below, in conjunction with the following drawings in which like reference numerals refer to corresponding parts throughout the figures.

FIG. 2 is a block diagram of a memory device of an example electronic system having one or more memory access queues, in accordance with some embodiments.

FIG. 7 is a flow diagram of an example method 700 for managing firmware control data in an electronic device, in accordance with some embodiments.

Like reference numerals refer to corresponding parts throughout the several views of the drawings.

DETAILED DESCRIPTION

Figure 1:
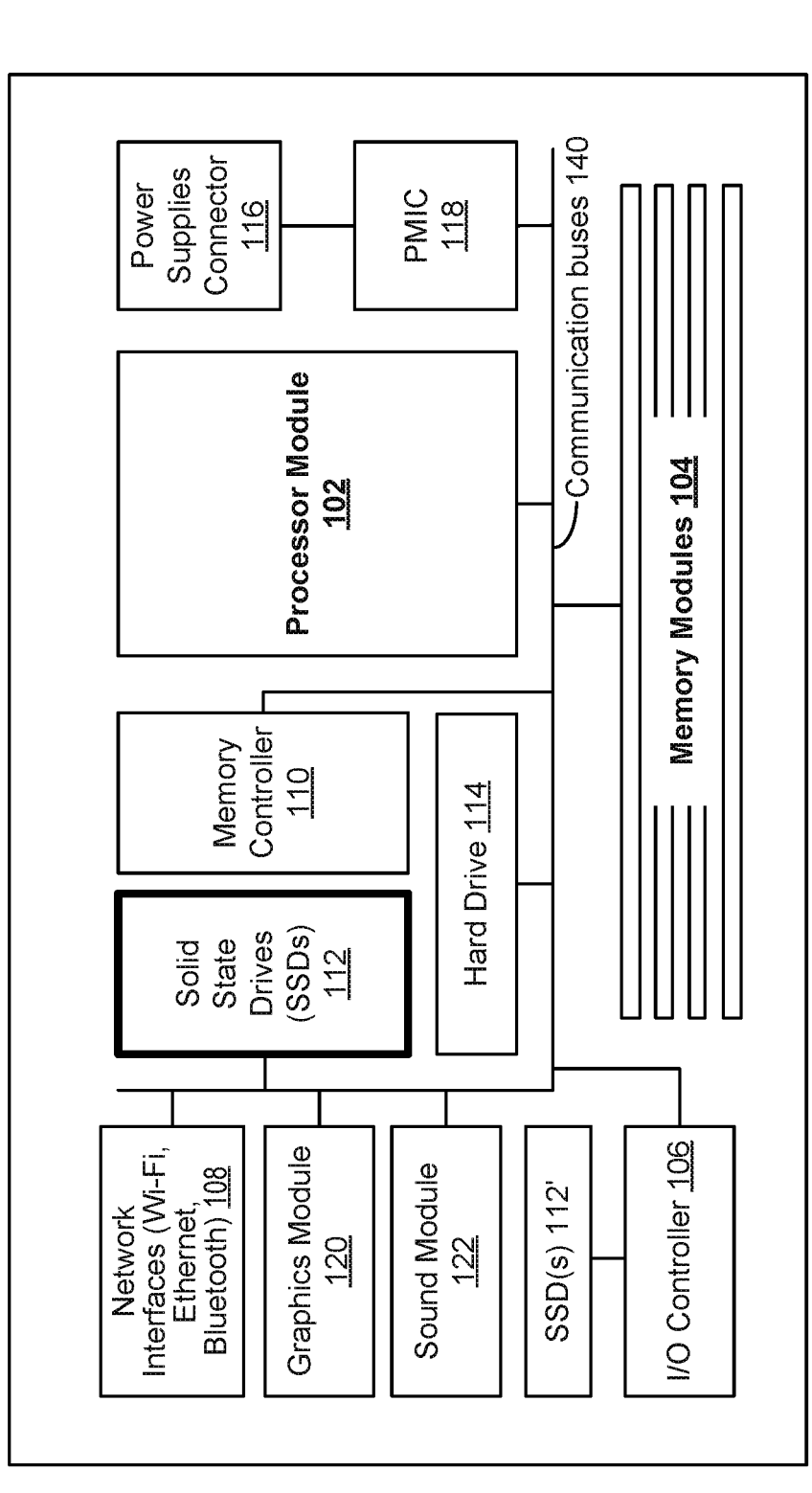
FIG. 1 is a block diagram of an example system module in a typical electronic system in accordance with some embodiments.

Reference will now be made in detail to specific embodiments, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used without departing from the scope of claims and the subject matter may be practiced without these specific details. For example, it will be apparent to one of ordinary skill in the art that the subject matter presented herein can be implemented on many types of electronic systems or devices with data storage capabilities.

This application is directed to methods, systems, devices, and non-transitory computer-readable media for managing firmware control data (e.g., different versions of firmware) stored in a memory device of an electronic device. The firmware that controls an electronic device includes control logic and control data, and the control logic reads and writes the control data to maintain a state of the electronic device and its operation. In some embodiments, the firmware on an electronic device is updated more than once (e.g., periodically throughout the electronic device's lifecycle). In some situations, only the control logic is updated, and in some situations, both the control logic and the control data are updated. The control data optionally persists across two or more different versions of the control logic. When this occurs, the control logic in a first version of the firmware automatically points to a subset of control data that changes a location in the control logic in a second version of the firmware. Specifically, a data descriptor map (DDM) is applied with each firmware version to map a plurality of data descriptors to a plurality of data locations in a corresponding control data structure. Checkpoints are introduced to compare the data descriptors automatically between versions to allow automatic detection and upgrade/downgrade of the control data.

In some embodiments, firmware development starts with a linker and a compiler. The compiler translates human-readable logic description of the control logic into a machine language, and creates a storage space for the control data needed by the control logic. The linker combines small sets of the control logic (which is already translated into the machine language) and the control data into a working program. The compiler and the linker obtain information of locations of the control data and associations between the small sets of the control logic and corresponding subsets of the control data, and communicate such information in the machine language while removing part of intermediate communication data from a final product of a firmware update. In some embodiments, during the course of upgrading a version of the control logic, a large number (e.g., millions) of subsets of control data are associated with and linked to corresponding small sets of the control logic. In some embodiments of this application, the intermediate communication data the compiler and linker is kept as part of the control data, and used to translate firmware control data between two different firmware versions on the electronic device itself when the firmware upgrade or downgrade happens.

In some embodiments of this application, the compiler produces the DDM, which is used to automatically translate control data into a unique identifier or descriptor that describes each piece of data in the control data. For example, the unique identifier or descriptor of the DDM includes one or more of: a name, a location, a size, and a type of each data item of the control data, and the DDM stores the unique identifier or descriptor with the control data. In some embodiments, any data that is duplicated or repeated (arrays, arrays of structures) is only recorded in the DDM. In an example, the DDM corresponds to 1 Megabyte data, and includes a few bytes of data description. During a firmware update, the DDM for the control data currently stored on the device is compared with the DDM for the control data that the updated firmware expects, and a difference between these two DDMs is identified and used to provide a control data structure for the firmware update.

FIG. 1 is a block diagram of an example system module 100 in a typical electronic system in accordance with some embodiments. The system module 100 in this electronic system includes at least a processor module 102, memory modules 104 for storing programs, instructions and data, an input/output (I/O) controller 106, one or more communication interfaces such as network interfaces 108, and one or more communication buses 140 for interconnecting these components. In some embodiments, the I/O controller 106 allows the processor module 102 to communicate with an I/O device (e.g., a keyboard, a mouse or a track-pad) via a universal serial bus interface. In some embodiments, the network interfaces 108 includes one or more interfaces for Wi-Fi, Ethernet and Bluetooth networks, each allowing the electronic system to exchange data with an external source, e.g., a server or another electronic system. In some embodiments, the communication buses 140 include circuitry (sometimes called a chipset) that interconnects and controls communications among various system components included in system module 100.

In some embodiments, the memory modules 104 include high-speed random-access memory, such as DRAM, static random-access memory (SRAM), double data rate (DDR) dynamic random-access memory (RAM), or other random-access solid state memory devices. In some embodiments, the memory modules 104 include non-volatile memory, such as one or more magnetic disk storage devices, optical disk storage devices, flash memory devices, or other non-volatile solid state storage devices. In some embodiments, the memory modules 104, or alternatively the non-volatile memory device(s) within the memory modules 104, include a non-transitory computer readable storage medium. In some embodiments, memory slots are reserved on the system module 100 for receiving the memory modules 104. Once inserted into the memory slots, the memory modules 104 are integrated into the system module 100.

In some embodiments, the system module 100 further includes one or more components selected from a memory controller 110, SSDs 112, a hard disk drive (HDD) 114, power management integrated circuit (PMIC) 118, a graphics module 120, and a sound module 122. The memory controller 110 is configured to control communication between the processor module 102 and memory components, including the memory modules 104, in the electronic system. The SSDs 112 are configured to apply integrated circuit assemblies to store data in the electronic system, and in many embodiments, are based on NAND or NOR memory configurations. The HDD 114 is a conventional data storage device used for storing and retrieving digital information based on electromechanical magnetic disks. The power supply connector 116 is electrically coupled to receive an external power supply. The PMIC 118 is configured to modulate the received external power supply to other desired DC voltage levels, e.g., 5V, 3.3V or 1.8V, as required by various components or circuits (e.g., the processor module 102) within the electronic system. In some embodiments, the graphics module 120 is configured to generate a feed of output images to one or more display devices according to their desirable image/video formats. In some embodiments, the sound module 122 is configured to facilitate the input and output of audio signals to and from the electronic system under control of computer programs.

In some embodiments, the system module 100 further includes SSDs 112' coupled to the I/O controller 106 directly. Conversely, the SSDs 112 are coupled to the communication buses 140. In an example, the communication buses 140 operates in compliance with Peripheral Component Interconnect Express (PCIe or PCI-E), which is a serial expansion bus standard for interconnecting the processor module 102 to, and controlling, one or more peripheral devices and various system components including components 110-122.

Further, one skilled in the art knows that other non-transitory computer readable storage media can be used, as new data storage technologies are developed for storing information in the non-transitory computer readable storage media in the memory modules 104, SSDs 112 and 112', and HDD 114. These new non-transitory computer readable storage media include those manufactured from biological materials, nanowires, carbon nanotubes and individual molecules, even though the respective data storage technologies are currently under development and yet to be commercialized.

FIG. 2 is a block diagram of a memory system 200 of an example electronic device having one or more memory access queues, in accordance with some embodiments. The memory system 200 is coupled to a host device 220 (e.g., a processor module 102 in FIG. 1) and configured to store instructions and data for an extended time, e.g., when the electronic device sleeps, hibernates, or is shut down. The host device 220 is configured to access the instructions and data stored in the memory system 200 and process the instructions and data to run an operating system and execute user applications. The memory system 200 further includes a controller 202 and a plurality of memory channels 204 (e.g., channel 204A, 204B, and 204N). Each memory channel 204 includes a plurality of memory cells. The controller 202 is configured to execute firmware level software to bridge the plurality of memory channels 204 to the host device 220.

Each memory channel 204 includes on one or more memory packages 206 (e.g., two memory dies). In an example, each memory package 206 (e.g., memory package 206A or 206B) corresponds to a memory die. Each memory package 206 includes a plurality of memory planes 208, and each memory plane 208 further includes a plurality of memory pages 210. Each memory page 210 includes an ordered set of memory cells, and each memory cell is identified by a respective physical address. In some embodiments, the memory system 200 includes a plurality of superblocks. Each superblock includes a plurality of memory blocks each of which further includes a plurality of memory pages 210. For each superblock, the plurality of memory blocks are configured to be written into and read from the memory system via a memory input/output (I/O) interface concurrently. Optionally, each superblock groups memory cells that are distributed on a plurality of memory planes 208, a plurality of memory channels 204, and a plurality of memory dies 206. In an example, each superblock includes at least one set of memory pages, where each page is distributed on a distinct one of the plurality of memory dies 206, has the same die, plane, block, and page designations, and is accessed via a distinct channel of the distinct memory die 206. In another example, each superblock includes at least one set of memory blocks, where each memory block is distributed on a distinct one of the plurality of memory dies 206 includes a plurality of pages, has the same die, plane, and block designations, and is accessed via a distinct channel of the distinct memory die 206. The memory system 200 stores information of an ordered list of superblocks in a cache of the memory system 200. In some embodiments, the cache is managed by a host driver of the host device 220, and called a host managed cache (HMC).

In some embodiments, the memory system 200 includes a single-level cell (SLC) NAND flash memory chip, and each memory cell stores a single data bit. In some embodiments, the memory system 200 includes a multi-level cell (MLC) NAND flash memory chip, and each memory cell of the MLC NAND flash memory chip stores 2 data bits. In an example, each memory cell of a triple-level cell (TLC) NAND flash memory chip stores 3 data bits. In another example, each memory cell of a quad-level cell (QLC) NAND flash memory chip stores 4 data bits. In yet another example, each memory cell of a penta-level cell (PLC) NAND flash memory chip stores 5 data bits. In some embodiments, each memory cell can store any suitable number of data bits. Compared with the non-SLC NAND flash memory chips (e.g., MLC SSD, TLC SSD, QLC SSD, PLC SSD), the SSD that has SLC NAND flash memory chips operates with a higher speed, a higher reliability, and a longer lifespan, and however, has a lower device density and a higher price.

Each memory channel 204 is coupled to a respective channel controller 214 (e.g., controller 214A, 214B, or 214N) configured to control internal and external requests to access memory cells in the respective memory channel 204. In some embodiments, each memory package 206 (e.g., each memory die) corresponds to a respective queue 216 (e.g., queue 216A, 216B, or 216N) of memory access requests. In some embodiments, each memory channel 204 corresponds to a respective queue 216 of memory access requests. Further, in some embodiments, each memory channel 204 corresponds to a distinct and different queue 216 of memory access requests. In some embodiments, a subset (less than all) of the plurality of memory channels 204 corresponds to a distinct queue 216 of memory access requests. In some embodiments, all of the plurality of memory channels 204 of the memory system 200 corresponds to a single queue 216 of memory access requests. Each memory access request is optionally received internally from the memory system 200 to manage the respective memory channel 204 or externally from the host device 220 to write or read data stored in the respective channel 204. Specifically, each memory access request includes one of: a system write request that is received from the memory system 200 to write to the respective memory channel 204, a system read request that is received from the memory system 200 to read from the respective memory channel 204, a host write request that originates from the host device 220 to write to the respective memory channel 204, and a host read request that is received from the host device 220 to read from the respective memory channel 204. It is noted that system read requests (also called background read requests or non-host read requests) and system write requests are dispatched by a memory controller to implement internal memory management functions including, but are not limited to, garbage collection, wear levelling, read disturb mitigation, memory snapshot capturing, memory mirroring, caching, and memory sparing.

In some embodiments, in addition to the channel controllers 214, the controller 202 further includes a local memory processor 218, a host interface controller 222, an SRAM buffer 224, and a DRAM controller 226. The local memory processor 218 accesses the plurality of memory channels 204 based on the one or more queues 216 of memory access requests. In some embodiments, the local memory processor 218 writes into and read from the plurality of memory channels 204 on a memory block basis. Data of one or more memory blocks are written into, or read from, the plurality of channels jointly. No data in the same memory block is written concurrently via more than one operation. Each memory block optionally corresponds to one or more memory pages. In an example, each memory block to be written or read jointly in the plurality of memory channels 204 has a size of 16 KB (e.g., one memory page). In another example, each memory block to be written or read jointly in the plurality of memory channels 204 has a size of 64 KB (e.g., four memory pages). In some embodiments, each page has 16 KB user data and 2 KB metadata. Additionally, a number of memory blocks to be accessed jointly and a size of each memory block are configurable for each of the system read, host read, system write, and host write operations.

In some embodiments, the local memory processor 218 stores data to be written into, or read from, each memory block in the plurality of memory channels 204 in an SRAM buffer 224 of the controller 202. Alternatively, in some embodiments, the local memory processor 218 stores data to be written into, or read from, each memory block in the plurality of memory channels 204 in a DRAM buffer 228A that is included in memory device 200, e.g., by way of the DRAM controller 226. Alternatively, in some embodiments, the local memory processor 218 stores data to be written into, or read from, each memory block in the plurality of memory channels 204 in a DRAM buffer 228B that is main memory used by the processor module 102 (FIG. 1). The local memory processor 218 of the controller 202 accesses the DRAM buffer 228B via the host interface controller 222.

In some embodiments, data in the plurality of memory channels 204 is grouped into coding blocks, and each coding block is called a codeword. For example, each codeword includes n bits among which k bits correspond to user data and (n-k) corresponds to integrity data of the user data, where k and n are positive integers. In some embodiments, the memory device 200 includes an integrity engine 230 (e.g., an LDPC engine) and registers 232 including a plurality of registers or SRAM cells or flip-flops and coupled to the integrity engine 230. The integrity engine 230 is coupled to the memory channels 204 via the channel controllers 214 and SRAM buffer 224. Specifically, in some embodiments, the integrity engine 230 has data path connections to the SRAM buffer 224, which is further connected to the channel controllers 214 via data paths that are controlled by the local memory processor 218. The integrity engine 230 is configured to verify data integrity for each coding block of the memory channels 204.

Figure 3A:
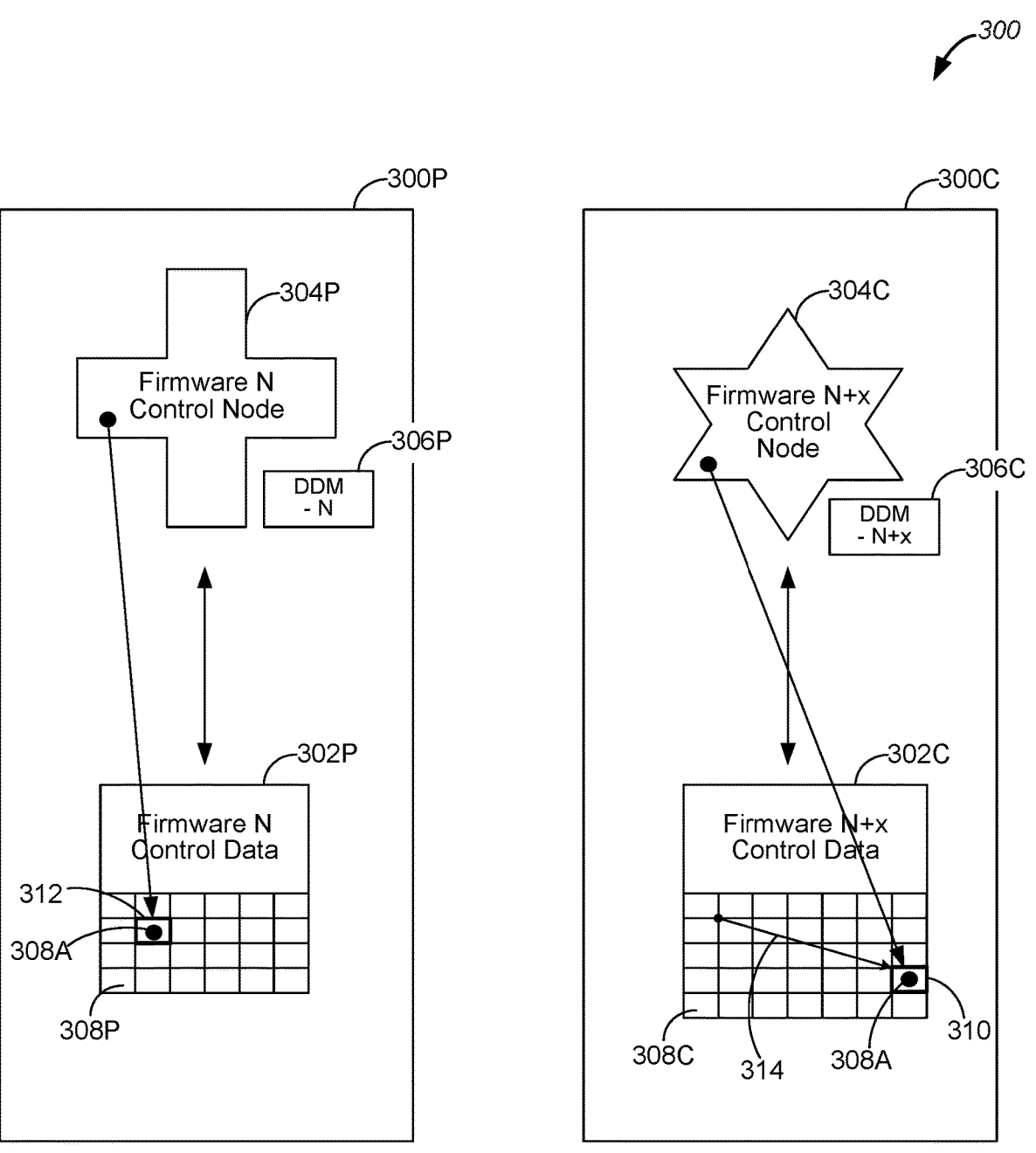
FIG. 3A is a schematic diagram of two versions of an example firmware program 300 that applies control data stored in different locations of two respective control data structures, in accordance with some embodiments.

FIG. 3A is a schematic diagram of two versions 300P and 300C of an example firmware program 300 that applies control data stored in different locations of two respective control data structures 302P and 302C, in accordance with some embodiments. The two versions of firmware 300 includes a current version 300C and a prior version 300P. The prior version 300P of the firmware program 300 includes a firmware control node 304P and a prior control data structure 302P used by the firmware program including the firmware control node 304P. The firmware control node 304P is associated with a prior DDM 306P. The prior DDM 306P maps a plurality of prior data descriptors of a plurality of prior control data items to a plurality of prior locations in the prior control data structure 302P. The prior control data structure 302P stores a plurality of prior control data items 308P identified by the plurality of prior data descriptors. The current version 300C of the firmware program 300 includes a firmware control node 304C and a current control data structure 302C used by the firmware program including the firmware control node 304C. In some embodiments, an electronic device operates on the prior version 300P of the firmware program 300 and receives a request to update the firmware program 300 with the current version 300C. The firmware control node 304C is obtained with a current data descriptor map (DDM) 306C. The current DDM 306C maps a plurality of current data descriptors of a plurality of current control data items 308C to a plurality of current locations in the current control data structure 302C.

The current control data structure 302C is not received with the request to update the firmware program 300, and is determined based on the current DDM 306C. Specifically, the current control data structure 302C corresponding to the current version of the firmware program 300 is automatically generated based on the prior control data structure 302P, the current DDM 306C, and the prior DDM 306P. The current control data structure 302C stores a plurality of current control data items 308C identified by the plurality of current data descriptors in the current DDM 306C. The current control data structure 302C is stored in the memory device of the electronic device. In some embodiments, the electronic device implements the current version 300C of the firmware program using the plurality of current control data items 308C stored in the current control data structure 302C.

In some embodiments, both of the current version 300C and the prior version 300P of the firmware use a first control date item 308A, which is specifically used in the firmware control nodes 304C and 304P. Locations of the first control data item 308A are different in the prior control data structure 302P and the current control data structure 302C. During the course of generating the current control data structure 302C, the electronic device identifies a first descriptor of the first control data item 308A in both the current DDM 306C and the prior DDM 306P. Based on the current DDM 306C, the first data descriptor corresponds to a first current location 310 in the current control data structure 302C. Based on the current DDM 306P, the first data descriptor corresponds to a first prior location 312 in the prior control data structure 302P. The first control data item 308A identified by the first data descriptor from the first prior location 312 in the prior control data structure 302P is copied to the first current location 310 in the current control data structure 302C. Referring to FIG. 3, in some embodiments, the first current location 310 in the current control data structure 300C is represented with a shift 314 in the current DDM 306C, and the shift 314 is measured from the first prior location 312 to the first current location 310 in the current control data structure 300C. In some embodiments not shown, the first current location 310 in the current control data structure 300C is directly represented in the current DDM 306C by, and determined based on, a shift measured with respect to a start position of the current control data structure 302C.

Figure 3B:
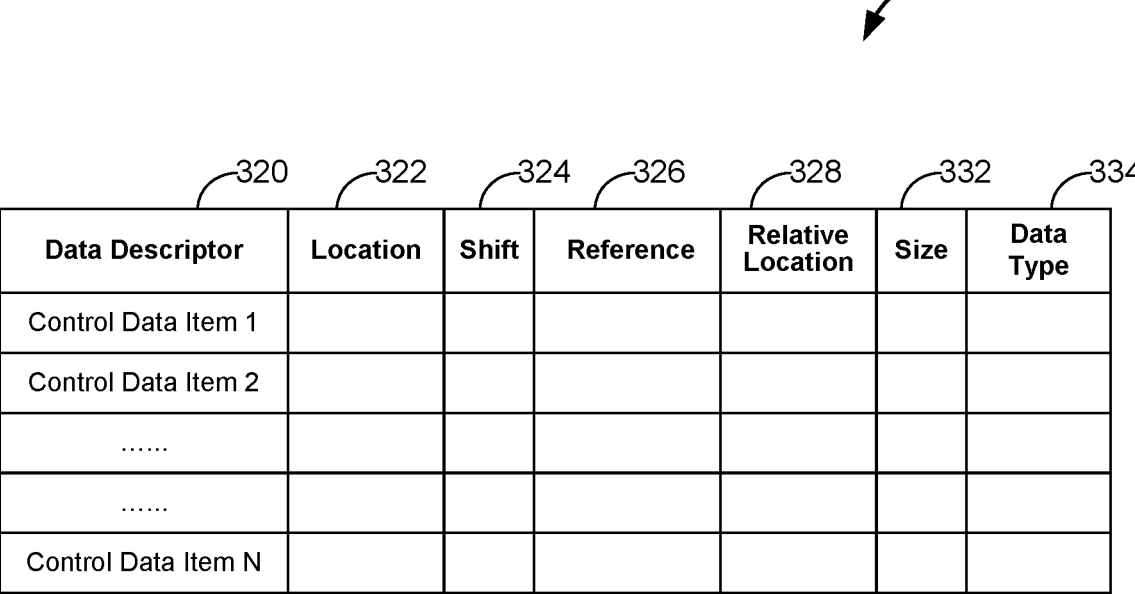
FIG. 3B is a diagram of an example DDM, in accordance with some embodiments.

FIG. 3B is a diagram of an example DDM 306 (e.g., a prior DDM 306P, a current DDM 306C), in accordance with some embodiments. The DDM 306 maps a plurality of data descriptors 320 to a plurality of locations in a control data structure (e.g., 302P or 302C in FIG. 3) corresponding to a version of a firmware program 300. The DDM 306 includes a plurality of fields, e.g., data descriptor 320, location 322, shift 324, reference 326, relative location 328, size 332, and data type 334. A data descriptor 320 is applied to identify a control data item 308P or 308C. A location 322 of the control data item 308P or 308C is measured with respect to a start position of the control data structure 302P or 302C. A shift 324 of the control data item 308C corresponds to a difference of locations of the control data item 308C between the prior control data structure 302P and the current control data structure 302C. For a control data item 308P or 308C, the reference 326 identifies a reference data item in the same control data structure 302P or 302C, and a relative location 328 of the control data item 308P or 308C corresponds to a difference of locations of the control data item and the reference data item in the control data structure 302P or 302C. A content data item 302P or 302C identified by the data descriptor 320 has a size 332 and a data type 334. A location of each content data item 308P or 308C is represented by any of the location 322, the shift 324, and the relative location 328.

Figure 4:
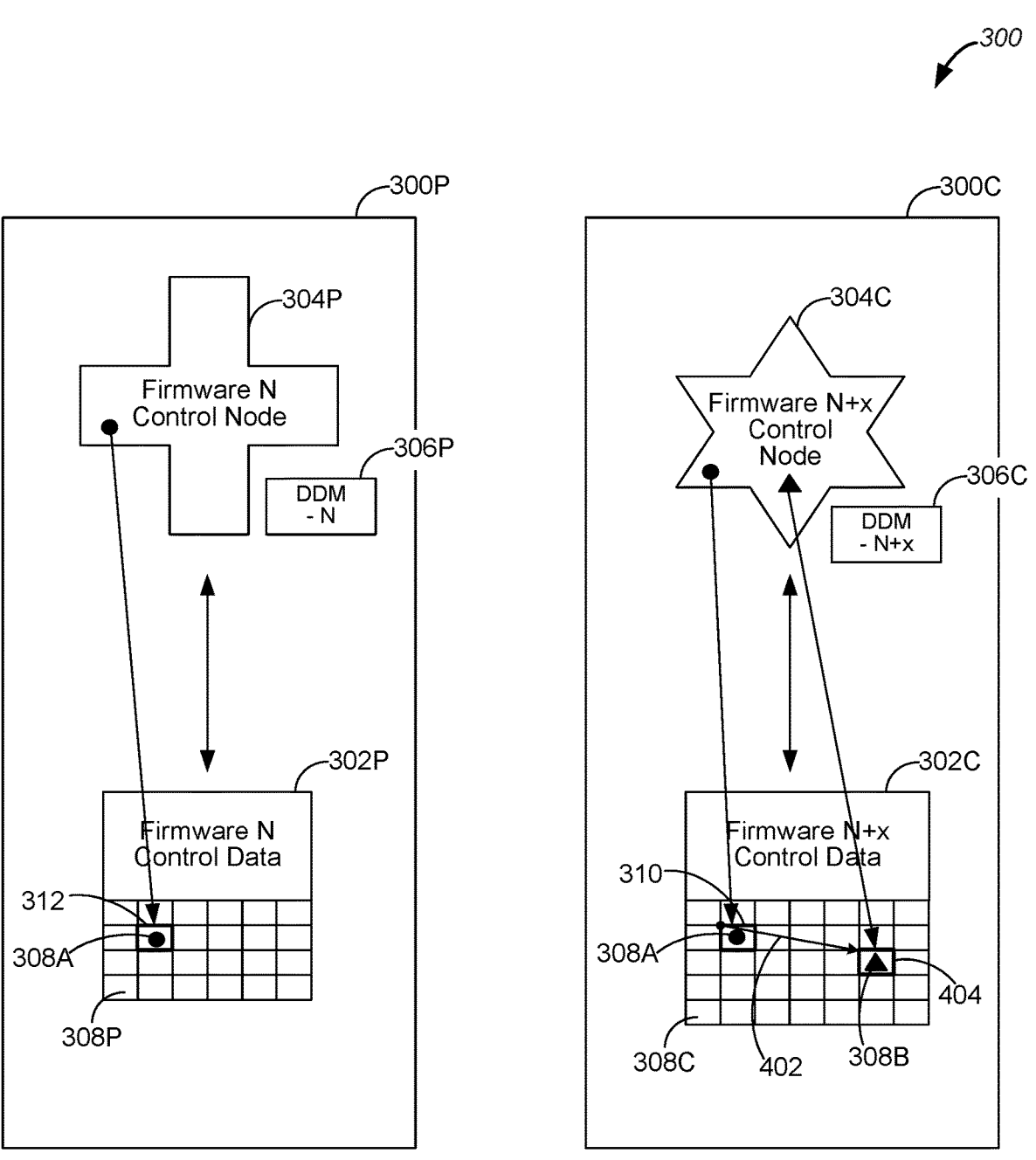
FIG. 4 is a schematic diagram of two versions of an example firmware program that applies different control data stored in different locations of two respective control data structures, in accordance with some embodiments.

FIG. 4 is a schematic diagram of two versions 300P and 300C of an example firmware program 300 that applies different control data stored in different locations of two respective control data structures 302P and 302C, in accordance with some embodiments. The two versions of the firmware program 300 includes a current version 300C and a prior version 300P. The prior version 300P of the firmware program 300 includes a firmware control node 304P and a prior control data structure 302P used by the firmware control node 304P. The firmware control node 304P is associated with a prior DDM 306P. The prior DDM 306P maps a plurality of prior data descriptors of a plurality of prior control data items to a plurality of prior locations in the prior control data structure 302P. The prior control data structure 302P stores a plurality of prior control data items 308P identified by the plurality of prior data descriptors. The current version 300C of the firmware program 300 includes a firmware control node 304C and a current control data structure 302C used by the firmware control node 304C. In some embodiments, an electronic device operates on the prior version 300P of the firmware program 300 and receives a request to update the firmware program 300 with the current version 300C. The firmware control node 304C is obtained with a current data descriptor map (DDM) 306C. The current DDM 306C maps a plurality of current data descriptors of a plurality of current control data items 308C to a plurality of current locations in the current control data structure 302C. The current control data structure 302C corresponding to the current version 300C of the firmware program 300 is automatically generated based on the prior control data structure 302P, the current DDM 306C, and the prior DDM 306P. The current control data structure 302C stores a plurality of current control data items 308C identified by the plurality of current data descriptors in the current DDM 306C.

Further, in some embodiments, the electronic device identifies one or more second control data items 308B in at least the current control data structure 302C. Each second control data item 308B has a relative location 402 with respect to the first current location 310 of the first control data item 308A. Current locations 404 of the one or more second control data items 308B in the current control data structure 302C are represented in the current DDM 306C by, and determined based on, the first current location 310 and the relative location 402 of each second control data item 308B. In some situations (e.g., FIG. 5), the first current location 310 in the current control data structure 302C is shifted with reference to the first prior location 312 in the prior control data structure 302P. Alternatively, in some situations (e.g., FIG. 4), the first current location 310 in the current control data structure 302C has the same location as, and is not shifted with reference to, the first prior location 312 in the prior control data structure 302P. In some embodiments not shown, the current locations 404 of the one or more second control data items 308B in the current control data structure 302C are represented in the current DDM 306C by, and determined based on, a shift measured with respect to a start position of the current control data structure 302C.

Figure 5:
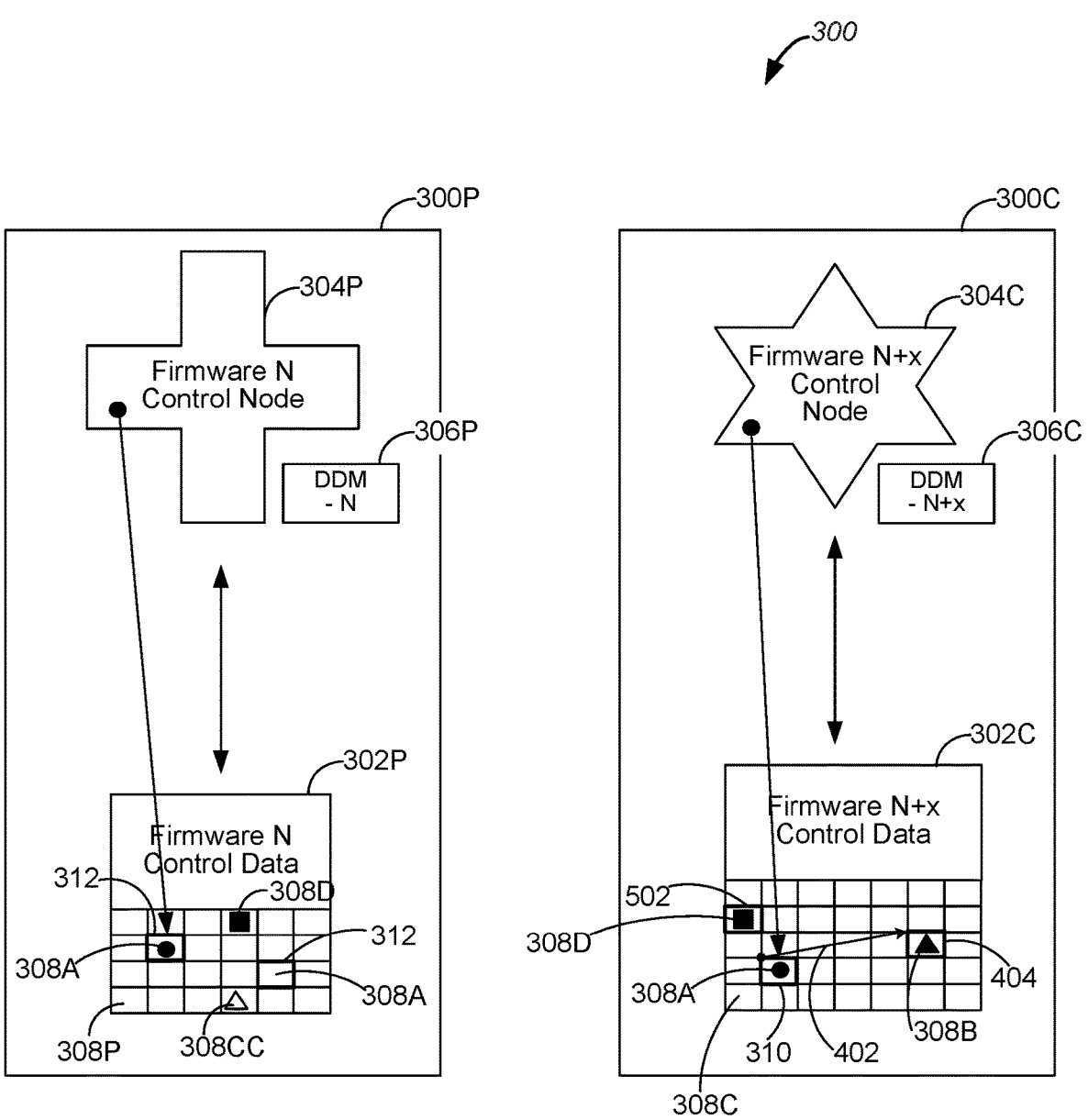
FIG. 5 is a schematic diagram of two versions of another example firmware program that apply different control data stored in different locations of control data structures, in accordance with some embodiments.

FIG. 5 is a schematic diagram of two versions 300P and 300C of another example firmware program 300 that apply different control data stored in different locations of control data structures 302P and 302C, in accordance with some embodiments. For a prior version 300P of the firmware program 300, a firmware control node 304P is associated with a prior DDM 306P. The prior DDM 306P maps a plurality of prior data descriptors of a plurality of prior control data items to a plurality of prior locations in the prior control data structure 302P. The prior control data structure 302P stores a plurality of prior control data items 308P identified by the plurality of prior data descriptors. The current version 300C of the firmware program 300 includes a firmware control node 304C and a current control data structure 302C. While an electronic device operates on the prior version 300P of the firmware program 300, it receives a request to update the firmware program 300 with the current version 300C. The firmware control node 304C is obtained with a current data descriptor map (DDM) 306C. The current DDM 306C maps a plurality of current data descriptors of a plurality of current control data items 308C to a plurality of current locations in the current control data structure 302C. The current control data structure 302C corresponding to the current version 300C of the firmware program 300 is automatically generated based on the prior control data structure 302P, the current DDM 306C, and the prior DDM 306P.

In some embodiments, the electronic device identifies one or more third control data items 308CC and a fourth control data item 308D in the prior control data structure 302P, and determines that the one or more third control data items 308CC are not included in the current control data structure 302C and that the fourth control data item 308D is included in the current control data structure 302C. Further, in some embodiments, a current location 502 of the fourth control data item 308D in the current control data structure 302C is represented by a relative location with respect to, and determined based on, the first current location 310 of the first control data item 308A. Alternatively, in some embodiments not shown, the current location 502 of the fourth control data item 308D in the current control data structure 302C is represented by, and determined based on, a shift measured with respect to a prior location of the fourth control data item 308D in the prior control data structure 302P. Alternatively and additionally, in some embodiments not shown, the current location 502 of the fourth control data item 308D in the current control data structure 302C is represented by, and determined based on, a shift measured with respect to a start position of the current control data structure 302C.

Figure 6:
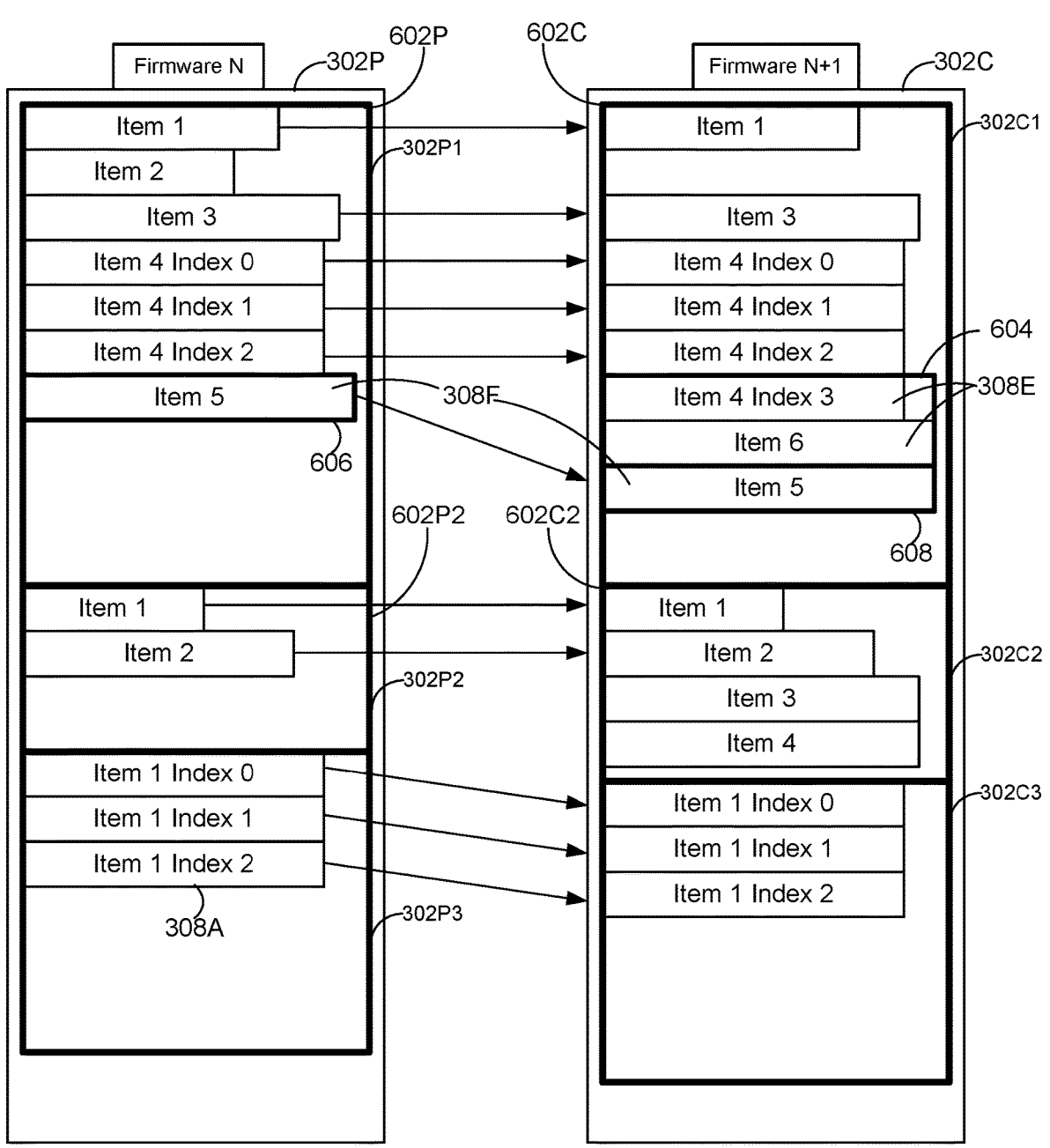
FIG. 6 is a structural diagram of another two example control data structures that are built based on DDMs corresponding to two versions of a firmware program, in accordance with some embodiments.

FIG. 6 is a structural diagram of another two example control data structures 302P and 302C that are built based on DDMs 306P and 306C corresponding to two versions 300P and 300C of a firmware program 300, in accordance with some embodiments. As explained above, an electronic device currently operates on a prior version 300P of the firmware program 300, and receives a request to update the firmware program 300 corresponding to a current version 300C. The prior version 300P of the firmware program 300 is completely loaded on the electronic device with a firmware control node 304P (FIG. 4), a prior DDM 306P, and a prior control data structure 302P. The prior DDM 306P maps a plurality of prior data descriptors of a plurality of prior control data items to a plurality of prior locations in the prior control data structure 302P. For the current version 300C of the firmware program 300, a firmware control node 304C is obtained with a current data descriptor map (DDM) 306C. The current DDM 306C maps a plurality of current data descriptors of a plurality of current control data items 308C to a plurality of current locations in the current control data structure 302C. In response to the request to update the firmware program 300, the current control data structure

302C is automatically generated based on the prior control data structure 302P, the current DDM 306C, and the prior DDM 306P.

In some embodiments, the current DDM 306C and the prior DDM 306P are compared, e.g., based on the data descriptors 320 (FIG. 3B), to determine whether there is at least one common control data item between the prior DDM 306P and the current DDM 306P. In accordance with a determination that there is at least one common control data item between the prior DDM 306P and the current DDM 306C, the current control data structure 320 is generated based at least in part on the prior control data structure 302C, the current DDM 306C, and the prior DDM 306P. In other words, in some embodiments, the current DDM 306C and the prior DDM 306P are compared to determine whether there is any change between the prior control data structure 302P and the current control data structure 302C. The current control data structure 302C is automatically generated in accordance with a determination that the prior control data structure 302P and the current control data structure 302C are distinct from one another. Conversely, in some embodiments, in accordance with a determination that there is no change between the prior control data structure 302P and the current control data structure 302C, the current DDM 306C is associated with the prior control data structure 302P. The prior control data structure 302P is used directly with the current version 300C of the firmware program.

In some embodiments, the firmware program 300 includes a plurality of historic versions that are loaded before the current version 300C. For example, the electronic device searches for a first data descriptor of a first control data item 308A (in both FIGS. 3A and 6) in a plurality of historic DDMs corresponding to a plurality of historic versions of the firmware program 300, starting from the most recent version, until the first data descriptor is identified in the prior DDM 306P corresponding to the prior version 300P of the firmware program 300. Further, in some embodiments, the prior version 300P is not the most recent version among the plurality of historic versions. Conversely, in some embodiments, the prior version 300P is the most recent version among the plurality of historic versions.

Stated another way, in some embodiments, the current version 300P and the prior version 300P are two successive versions of the firmware program 300, and the current version 300C immediately follows the prior version 300P. At least one of the current content data items 308C (FIG. 3) is generated based on the prior version 300P that immediately precedes the current version 300C. Alternatively, in some embodiments, the current version 300P and the prior version 300P are not two successive versions of the firmware program 300, and the current version 300C is at least two or more versions following the prior version 300P. At least one of the current content data items 308C (FIG. 3) is generated based on the prior version 300P that is older than the current version 300C by two or more versions.

Additionally and alternatively, in some embodiments, two subsets of the current content data items 308C (FIG. 3) are generated based on two prior versions 300P that are older than the current version 300C. A first subset of the current content data items 308C (FIG. 3) is generated based on a first prior version 300P of the firmware program 300, and a second subset of the current content data items 308C (FIG. 3) is generated based on a second prior version 300P of the firmware program 300. Specifically, two distinct control data items 308P identified by two distinct data descriptors 320 are copied from two prior locations in two prior control data structures 302P corresponding to two different prior versions 300P of the firmware program 300 to the current control data structure 302C. More specifically, in some embodiments, the prior DDM 306P includes a first prior DDM corresponding to a first prior version of the firmware program 300. A second prior DDM and a second prior control data structure corresponding to a second prior version of the firmware program are identified in the memory device. The current control data structure 302C corresponding to the current version 300C of the firmware program 300 is generated based on the prior control data structure associated with the first prior version of the firmware program, the current DDM, the first prior DDM, the second prior DDM, and the second prior control data structure.

In some embodiments, the prior control data structure 302P includes a plurality of portions 302P1, 302P2, and 302P3, and the current control data structure 302C includes a plurality of portions 302C1, 302C2, and 302C3. In some embodiments, two corresponding portions 302P1 and 302C1 have the same size. For example, the portion 302P1 of the prior control data structure 302P reserved some unused space, which is sufficient to accommodate storage of additional fifth content data items 300E. In some embodiments, a content data item ("Item 2") is not used in the current version 300C, and associated memory space is not mapped in the current DDM 306P, while the following content data items are not moved and continue to be stored in their original addresses. In some embodiments, two corresponding portions 302P2 and 302C2 have different sizes. For example, the portion 302C2 of the current control data structure 302C is expanded, such that new content data items (e.g., "Item 3" and "Item 4") are added in the portion 302C2 of the current control data structure 302C. As a result, all content data items 308C stored in the portion 302C3 are shifted in the current control data structure 302C.

In some embodiments, each of a subset of the plurality of current locations of the control data items 308 includes a respective current offset (e.g., associated with the location 322 in FIG. 3B) measured with respect to a start position 602C of the current control data structure 302C. In some embodiments, each of a subset of the plurality of current locations of the control data items 308 includes a respective current offset measured with respect to a start position of a portion (e.g., 302C1, 302C2 and 302C3) of the current control data structure 302C. For example, each of the current control data items 308C (e.g., "Item 1," "Item 2," "Item 3," "Item 4," and "Item 5") in the second portion 302C2 of the current control data structure 302C is represented by its respective current offset with respect to one of a start position 602C of the entire structure 302C and a start position 602C2 of the second portion 302C2 of the structure 302C. In some embodiments, each of a subset of the plurality of prior locations includes a respective prior offset measured with respect to a start position 602C of the prior control data structure 302P. In some embodiments, each of a subset of the plurality of prior locations includes a respective prior offset measured with respect to a start position of a portion (e.g., 302P1, 302P2 and 302P3) of the prior control data structure 302P. For example, each of the prior control data items 308P (e.g., "Item 1," "Item 2") in the second portion 302P2 of the prior control data structure 302P is represented by its respective prior offset with respect to one of a start position 602P of the entire structure 302P and a start position 602P2 of the second portion 302P2 of the structure 302P.

In some embodiments, the electronic device obtains a fifth control data item 308E (e.g., "Item 6" and "Item 4 Index 3")

with the current version 300C of the firmware program and identifies a fifth data descriptor of the fifth control data item 308E in the current DDM 302C. It is determined that the fifth data descriptor corresponds to a fifth current location 604 in the current control data structure 302C based on the current DDM 306C and that the fifth data descriptor is not in the prior control data structure 302P based on the prior DDM 306P. The electronic device stores the fifth control data item 308E (e.g., "Item 4 Index 3" and "Item 6") identified by the fifth data descriptor at the fifth current location 604 in the current control data structure 302C. Further, in some embodiments, the electronic device identifies one or more sixth control data items 308F (e.g., "Item 5") located on or in proximity to a fifth prior position 606 corresponding to the fifth current location 608. It is determined that the one or more sixth control data items 308F are included in both the prior control data structure 302P and the current control data structure 302C. Current locations of the one or more sixth control data items 308E in the current control data structure are determined based on the fifth current location 604 of the fifth control data item 308E. For example, two control data items, "Item 6" and "Item 4 Index 3", are inserted between another two control data items, "Item 4 Index 2" and "Item 5." The location of the control data item, "Item 5", is shifted to allow the two control data items, "Item 6" and "Item 4 Index 3", to be inserted into the first portion of the current control data structure 302C.

Referring to FIG. 6, in some embodiments, the prior DDM 306P and the current DDM 306C are compared to identify some changes among the control data structures 302P and 302C. In the first portions 302P1 and 302C1 between Firmware N and Firmware N+x, item 2 is removed, "Item 4" has another element (e.g., "Item 4 Index 3") added, and "Item 6" is added after "Item 4." Because of the previous two changes, "Item 5" is shifted downward. The DDMs 306P and 306C are used to detect these changes and adjust locations of the content data items 308C in the current control data structure 302C automatically. In some situations, the DDMs 306P and 306C are used to detect changes to the current control data structure 302C that might affect any structures packed after it. For example, "Item 3" and "Item 4" are added to the second portion 302C2 of the current control data structure 302C, causing the second portion 302C2 to be expanded beyond its reserved space. Further, in some embodiments, the third portion 302C3 that is positioned after the second portion 302C2 is moved download.

Table 1 is a list of data formats of data entries applied in a DDM file including a DDM 306, in accordance with some embodiments. The DDM file includes a plurality of rows and a plurality of columns. The DDM file corresponds to a tree where each non-leaf node is an array of structures, and each leaf node is a fundamental data type (int, unit). This file is built every time a version of the firmware program 300 is built and attached to the firmware program 300. When firmware is sent to an electronic device as an update, the electronic device extracts an old version DDM 306P from an older version DDM file of an old version 300P of the firmware, compares the old version DDM 306P to a new version DDM 306C attached to the update of the firmware, and determines whether there is a change between these two DDMs 306P and 306C. In accordance with a determination there is a change from the old version DDM 306P to the new version DDM 306C, the memory device 200 determines whether a prior control data structure 302P can be converted to a current control data structure 302C based on the old version DDM 306P and the new version DDM 306C.

TABLE 1

| Field Name (Enum Name) | Type | Value | Description |
|---|---|---|---|
| Hash of Key | Uint32 | | This is the field identifier (also called data descriptor 320 in FIG. 3B). This is invariant, and is protected from collisions, across all versions of firmware. If this moves, associated data needs to move accordingly. |
| offsetWithinData | Uint32 | | This represents an offset (also called shift 324 in FIG. 3B) in bytes within the data file, relative to a DDM entry's parent. In general, the DDM entry's parent refers either to the file itself (for the highest-level structure described by the DDM) or to the entry's parent structure. This allows arrays of structures to be mapped because each offset is relative to that entry in the array. |
| Type (STRUCT) | Enumeration | 0x00 | DDM entry data type is a structure or array of structures. |
| Type (END_OF_STRUCT) | | 0x01 | This is a marker indicating an end of the current structure. |
| Type (RESERVED) | | 0x02 | Data described by this DDM entry is reserved (e.g., used for faster upgrades). |
| Type (UNIT8) | | 0x03 | This DDM entry data type is a uint8_t or an array of uint8_t's. |
| Type (UNIT16) | | 0x04 | This DDM entry data type is a uint16_t or an array of uint16_t's. |
| Type (UNIT32) | | 0x05 | This DDM entry data type is a uint32_t or an array of uint32_t's. |
| Type (UNIT64) | | 0x06 | This DDM entry data type is a uint64_t or an array of uint64_t's. |
| Type (INT8) | | 0x07 | This DDM entry data type is an int8_t or an array of int8_t's. |
| Type (INT16) | | 0x08 | This DDM entry data type is an int16_t or an array of int16_t's. |
| Type (INT32) | | 0x09 | This DDM entry data type is an int32_t or an array of int32_t's. |
| Type (INT64) | | 0x0A | This DDM entry data type is an int64_t or an array of int64_t's |
| Type (PADDING) | | 0x8F | This is used for intra-structure padding, e.g. if the complier |
| count | Uint32 | | This indicates a number of entries a data item has. This is used for arrays, indicating a number of elements in the array. This is used at an end of a structure, indicating any padding space at the end of the structure. |
| indexWithinDDM | Uint32 | | Given a STRUCT-type DDM entry, this specifies a DDM index offset relative to that entry at which to find the first child DDM entry. |
| default value | Uint32 | | When an entry is created by either an expansion of an array or because a new entry has been added, the entry is populated with this value initially, allowing firmware developers to differentiate a new entry that has been added from an old entry. |

FIG. 7 is a flow diagram of an example method 700 for managing firmware control data in an electronic device, in accordance with some embodiments. An electronic system includes a host device 220 and the memory device 200 coupled to the host device 220. The electronic device obtains (operation 702) a current data descriptor map (DDM) corresponding to a current version 300C of a firmware program 300. The current DDM 306C maps (operation 704) a plurality of current data descriptors to a plurality of current locations in a current control data structure 302C. The electronic device identifies (operation 706), in the memory device, a prior DDM 306P and a prior control data structure 302P corresponding to a prior version 300P of the firmware program 300. The prior DDM 306P maps (operation 708) a plurality of prior data descriptors to a plurality of prior locations in the prior control data structure 302P, and the prior control data structure 302P stores (operation 710) a plurality of prior control data items 308P identified by the plurality of prior data descriptors. The electronic device automatically generates (operation 712) the current control data structure 302C corresponding to the current version 300C of the firmware program 300 based on the prior control data structure 302P, the current DDM 306C, and the prior DDM 306P. The current control data structure 302C stores (operation 714) a plurality of current control data items 308C identified by the plurality of current data descriptors. The electronic device stores (operation 716) the current control data structure 302C in the memory device. In some embodiments, the electronic device implements (operation 718) the current version 300C of the firmware program 300 on the electronic device using the plurality of current control data items 308C stored in the current control data structure 302C.

In some embodiments, the electronic device automatically generates the current control data structure 302C by identifying a first data descriptor of a first control data item 308A in both the current DDM 306C and the prior DDM 306P, determining that the first data descriptor corresponds to a first current location 310 in the current control data structure 302C based on the current DDM 306C, determining that the first data descriptor corresponds to a first prior location 312 in the prior control data structure 302P based on the prior DDM 306P, and copying the first control data item 308A (FIG. 3A) identified by the first data descriptor from the first prior location 312 in the prior control data structure 302P to the first current location 310 in the current control data structure 302C. Further, in some embodiments, the first current location 310 in the current control data structure 302C is represented with a shift from the first prior location 312 in the prior control data structure 302P. In some embodiments, the electronic device identifies one or more second control data items 308B (FIG. 4) in the current control data structure 302C. Each second control data item 308B has a relative location with respect to the first current location 310 of the first control data item 308A. The electronic device determines current locations of the one or more second control data items 308B in the current control data structure 302C based on the first current location 310 and the relative location. In some embodiments, the electronic device identifies one or more third control data items 308CC and a fourth control data item 308D (FIG. 5) in the prior control data structure 302P, determines that the one or more third control data items 308CC are not included in the current control data structure 302C and that the fourth control data item 308D is included in the current control data structure 302C, and determines a current location of the fourth control data item 308D in the current control data structure 302C based on the first current location 310 of the first control data item 308A.

In some embodiments, the electronic device automatically generates the current control data structure 302C by obtaining a fifth control data item 308E (FIG. 6) with the current version 300C of the firmware program 300, identifying a fifth data descriptor of the fifth control data item 308E in the current DDM 306C, determining that the fifth data descriptor corresponds to a fifth current location in the current control data structure 302C based on the current DDM 306C and that the fifth data descriptor is not in the prior control data structure 302P based on the prior DDM 306P, and storing the fifth control data item 308E identified by the fifth data descriptor at the fifth current location in the current control data structure 302C. Further, in some embodiments, the electronic device identifies one or more sixth control data items 308F (FIG. 6) located on or in proximity to a fifth prior position corresponding to the fifth current location, determines that the one or more sixth control data items 308F are included in both the prior control data structure 302P and the current control data structure 302C, and determines current locations of the one or more sixth control data items 308F in the current control data structure 302C based on the fifth current location of the fifth control data item 308E.

In some embodiments, each of a subset of the plurality of current locations includes a respective current offset measured with respect to a start position 602C or 602C2 of the current control data structure 302C, and each of a subset of the plurality of prior locations includes a respective prior offset measured with respect to a start position 602P or 602P2 of the prior control data structure 302P.

In some embodiments, the firmware program 300 includes a plurality of historic versions that are loaded before the current version 300C. The electronic device searches for a first data descriptor of a first control data item 308A in a plurality of historic DDMs corresponding to the plurality of historic versions of the firmware program 300, starting from the most recent version, until the first data descriptor is identified in the prior DDM 306P corresponding to the prior version 300P of the firmware program 300. Further, in some embodiments, the prior version 300P is not the most recent version among the plurality of historic versions.

In some embodiments, the electronic device compares the current DDM 306C and the prior DDM 306P to determine whether there is at least one common control data item between the prior DDM 306P and the current DDM 306C. In accordance with a determination that there is at least one common control data item between the prior DDM 306P and the current DDM 306C, the current control data structure 302C is generated based at least in part on the prior control data structure 302P, the current DDM 306C, and the prior DDM 306P.

In some embodiments, the prior DDM 306P includes a first prior DDM 306P corresponding to a first prior version of the firmware program 300. The electronic device identifies, in the memory device, a second prior DDM 306P and a second prior control data structure 302P corresponding to a second prior version of the firmware program 300. The current control data structure 302C corresponding to the current version 300C of the firmware program 300 is generated based on the prior control data structure 302P associated with the first prior version of the firmware program 300, the current DDM 306C, the first prior DDM 306P, the second prior DDM 306P, and the second prior control data structure 302P.

In some embodiments, the electronic device automatically generates the current control data structure 302C by copying two distinct control data items 308P identified by two distinct data descriptors 320 (FIG. 3B) from two prior locations in two prior control data structures 302P corresponding to two different prior versions 300P of the firmware program 300 to the current control data structure 302C.

In some embodiments, the electronic device compares the current DDM 306C and the prior DDM 306P to determine whether there is any change between the prior control data structure 302P and the current control data structure 302C. The current control data structure 302C is automatically generated in accordance with a determination that the prior control data structure 302P and the current control data structure 302C are distinct from one another.

In some embodiments, the electronic device compares the current DDM 306C and the prior DDM 306P to determine whether there is any change between the prior control data structure 302P and the current control data structure 302C. The electronic device automatically generates the current control data structure 302C by, in accordance with a determination that there is no change between the prior control data structure 302P and the current control data structure 302C, associating the current DDM 306C with the prior control data structure 302P.

In some embodiments of this application, a compiler produces the DDM 306P or 306C, which is used to automatically translate control data into a unique identifier or descriptor that describes each piece of data in the control data. For example, the unique identifier or descriptor of the DDM 306P or 306C includes one or more of: a name, a location, a size, and a type of each data item of the control data, and the DDM 306P or 306C stores the unique identifier or descriptor with the control data. In some embodiments, any data that is duplicated or repeated (arrays, arrays of structures) is only recorded in the DDM 306P or 306C. In an example, the DDM 306P or 306C corresponds to 1 Megabyte data, and includes a few bytes of data description. During a firmware update, the DDM 306P or 306C for the control data currently stored on the device is compared with the DDM 306P or 306C for the control data that the updated firmware expects, and a difference between these two DDMs 306P and 306C is identified and used to provide a control data structure for the firmware update.

DDMs 306P and 306C allow for automatic translation of data structures without human intervention, because the DDMs 306P and 306C include information of the control data applied by the firmware. In some embodiments, a new version of the control data contains a new field, and the DDMs 306P and 306C support initial values for that field. In some embodiments, control data only changes at specific times, e.g., at a firmware update, and the DDMs 306P and 306C only need to be compared at those times. The firmware operates as normal at all other times without being interrupted by updating the DDMs 306P and 306C. In some embodiments, the DDMs 306P and 306C are produced automatically at a build time, and used to detect changes at multiple stages of a firmware release process with little to no human intervention. In some embodiments, the DDMs 306P and 306C are natively generated as part of a firmware build process, and therefore, data structure version changes cannot be missed by human error since. If the DDMs 306P and 306C for all customer released binaries are kept as part of a release process, then pre-release firmware is optionally confidently compared and validated against a proposed upgrade target before being released to a customer.

DDMs 306P and 306C enables automation of firmware upgrades and downgrades. Under some circumstances, customers request a downgrade of the firmware. However, manual upgrade would not allow for downgrade as code would be written convert the data in firmware N+x. Firmware N has no knowledge of what happens in the future so cannot contain any back conversion code. If the change is appropriately recognized and convertible by the DDM 306P or 306C, this is no longer a problem. As DDMs 306P and 306C are generic in terms of data size and default value descriptions, custom routines to execute conversion between data structure formats are completely unnecessary. Generic conversion routines are applied to handle any related DDM sets, saving custom conversion development, validation, and escapes.

Additionally, in some embodiments, the DDMs 306P and 306C eliminate a need for overprovisioning data structures to accommodate potential minor revision rolls. The DDM is self-describing and key pairs are uniquely hashed for a life of the firmware. Any possible translations on upgrade/downgrade between DDMs 306P and 306C is possible. There is no compatibility concern among different versions of the firmware. In some embodiments, the DDM achieves advantages of self-describing file formats like YAML/JSON/XML without using a large RAM, media footprint, or unbounded ASCII descriptors. This is extremely well suited for a resource constrained embedded environment (e.g., in an embedded device) where low bill of materials (BOM) costs, predictable latencies, and minimal firmware complexity are desirable.

One way to detect is to look for a lack of versioning data, if a competitor moves from having versioning data to not having versioning data that is a strong indicator that they might be infringing. The lack of versioning data may be detectable via inspection of physical payload and header/meta data for files frequently written to media, which are typically written in plaintext; or alternatively a lack of advertised versioning on released binaries to customers. Additionally if competitors lock down their updates by version numbers they are not infringing, but if they suddenly switch from locking down updates of version structures to allowing them, this could be a strong indication of infringement. Seamless firmware updates observed by customers accustomed to restrictions or workarounds from electronic device vendor binary releases is an additional indicator of potential infringement. Corresponding to the aforementioned: released product literature, marketing literature, or Field Application Engineering updates claiming robustness improvements to Firmware Update related to compatibility would warrant further assessment of potential infringement.

Memory is also used to store instructions and data associated with the method 700, and includes high-speed random-access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory, optionally, includes one or more storage devices remotely located from one or more processing units. Memory, or alternatively the non-volatile memory within memory, includes a non-transitory computer readable storage medium. In some embodiments, memory, or the non-transitory computer readable storage medium of memory, stores the programs, modules, and data structures, or a subset or superset for implementing method 600.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various embodiments. In some embodiments, the memory, optionally, stores a subset of the modules and data structures identified above. Furthermore, the memory, optionally, stores additional modules and data structures not described above.

The terminology used in the description of the various described implementations herein is for the purpose of describing particular implementations only and is not intended to be limiting. As used in the description of the various described implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. Additionally, it will be understood that, although the terms "first," "second," etc. may be used herein to describe various elements, these elements should not be limited by these terms. These terms are only used to distinguish one element from another.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

Although various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages can be implemented in hardware, firmware, software or any combination thereof.

What is claimed is:

1. A method implemented at an electronic device including a memory device, comprising:

receiving a request to update a firmware program with a current version without receiving a current control data structure including control data used to maintain a state and operation of the electronic device while the current version of the firmware program is executed:

automatically building the current control data structure while building a current version of a firmware program, including:

obtaining a current data descriptor map (DDM), wherein the current DDM maps a plurality of current data descriptors to a plurality of current locations in the current control data structure;

identifying, in the memory device, a prior DDM and a prior control data structure corresponding to a prior version of the firmware program, wherein the prior DDM maps a plurality of prior data descriptors to a plurality of prior locations in the prior control data structure, and the prior control data structure stores a plurality of prior control data items identified by the plurality of prior data descriptors; and translating the prior control data structure to the current control data structure corresponding to the current version of the firmware program based on the current DDM and the prior DDM, independently of building the current version of the firmware program, wherein the current control data structure stores a plurality of current control data items identified by the plurality of current data descriptors;

storing the current control data structure in the memory device; and implementing the current version of the firmware program on the electronic device using the plurality of current control data items stored in the current control data structure, without receiving the current control data structure jointly with the current version of the firmware program, thereby eliminating a need for overprovisioning data structures to accommodate revision rolls and conserving resources of a resource constrained embedded environment.

2. The method of claim 1, wherein translating the prior control data structure to the current control data structure further comprising:

identifying a first data descriptor of a first control data item in both the current DDM and the prior DDM;

determining that the first data descriptor corresponds to a first current location in the current control data structure based on the current DDM;

determining that the first data descriptor corresponds to a first prior location in the prior control data structure based on the prior DDM; and copying the first control data item identified by the first data descriptor from the first prior location in the prior control data structure to the first current location in the current control data structure.

3. The method of claim 2, the first current location in the current control data structure is represented with a shift from the first prior location in the prior control data structure.

4. The method of claim 2, further comprising:

identifying one or more second control data items in the current control data structure, each second control data item having a relative location with respect to the first current location of the first control data item; and determining current locations of the one or more second control data items in the current control data structure based on the first current location and the relative location.

5. The method of claim 2, further comprising:

identifying one or more third control data items and a fourth control data item in the prior control data structure;

determining that the one or more third control data items are not included in the current control data structure and that the fourth control data item is included in the current control data structure; and determining a current location of the fourth control data item in the current control data structure based on the first current location of the first control data item.

6. The method of claim 1, wherein translating the prior control data structure to the current control data structure further comprising:

obtaining a fifth control data item with the current version of the firmware program;

identifying a fifth data descriptor of the fifth control data item in the current DDM;

determining that the fifth data descriptor corresponds to a fifth current location in the current control data structure based on the current DDM and that the fifth data descriptor is not in the prior control data structure based on the prior DDM; and storing the fifth control data item identified by the fifth data descriptor at the fifth current location in the current control data structure.

7. The method of claim 6, further comprising:

identifying one or more sixth control data items located on or in proximity to a fifth prior position corresponding to the fifth current location;

determining that the one or more sixth control data items are included in both the prior control data structure and the current control data structure; and determining current locations of the one or more sixth control data items in the current control data structure based on the fifth current location of the fifth control data item.

8. The method of claim 1, wherein each of a subset of the plurality of current locations includes a respective current offset measured with respect to a start position of the current control data structure, and each of a subset of the plurality of prior locations includes a respective prior offset measured with respect to a start position of the prior control data structure.

9. The method of claim 1, wherein the firmware program includes a plurality of historic versions that are loaded before the current version, the method further comprising: searching for a first data descriptor of a first control data item in a plurality of historic DDMs corresponding to the plurality of historic versions of the firmware program, starting from the most recent version, until the first data descriptor is identified in the prior DDM corresponding to the prior version of the firmware program.

10. The method of claim 9, wherein the prior version is not the most recent version among the plurality of historic versions.

11. The method of claim 1, wherein the prior control data structure is translated in a machine language to the current control data structure based on the current DDM and the prior DDM.

12. An electronic device, comprising:
one or more processors;
a memory device; and
memory storing one or more programs for execution by the one or more processors, the one or more programs further comprising instructions for:
receiving a request to update a firmware program with a current version without receiving a current control data structure including control data used to maintain a state and operation of the electronic device while the current version of the firmware program is executed;
automatically building the current control data structure while building a current version of a firmware program, including:
obtaining a current data descriptor map (DDM), wherein the current DDM maps a plurality of current data descriptors to a plurality of current locations in the current control data structure;
identifying, in the memory device, a prior DDM and a prior control data structure corresponding to a prior version of the firmware program, wherein the prior DDM maps a plurality of prior data descriptors to a plurality of prior locations in the prior control data structure, and the prior control data structure stores a plurality of prior control data items identified by the plurality of prior data descriptors; and
translating the prior control data structure to the current control data structure corresponding to the current version of the firmware program based on the current DDM and the prior DDM, independently of building the current version of the firmware program, wherein the current control data structure stores a plurality of current control data items identified by the plurality of current data descriptors;
storing the current control data structure in the memory device; and
implementing the current version of the firmware program on the electronic device using the plurality of current control data items stored in the current control data structure, without receiving the current control data structure jointly with the current version of the firmware program, thereby eliminating a need for overprovisioning data structures to accommodate revision rolls and conserving resources of a resource constrained embedded environment.

13. The electronic device of claim 12, the one or more programs further comprising instructions for:
comparing the current DDM and the prior DDM to determine whether there is at least one common control data item between the prior DDM and the current DDM;
wherein in accordance with a determination that there is at least one common control data item between the prior DDM and the current DDM, the current control data structure is generated based at least in part on the prior control data structure, the current DDM, and the prior DDM.

14. The electronic device of claim 12, wherein the prior DDM includes a first prior DDM corresponding to a first prior version of the firmware program, the one or more programs further comprising instructions for:
identifying, in the memory device, a second prior DDM and a second prior control data structure corresponding to a second prior version of the firmware program;
wherein the current control data structure corresponding to the current version of the firmware program is generated based on the prior control data structure associated with the first prior version of the firmware program, the current DDM, the first prior DDM, the second prior DDM, and the second prior control data structure.

15. The electronic device of claim 12, wherein translating the prior control data structure to the current control data structure further comprising:
copying two distinct control data items identified by two distinct data descriptors from two prior locations in two prior control data structures corresponding to two different prior versions of the firmware program to the current control data structure.

16. The electronic device of claim 12, the one or more programs further comprising instructions for:
comparing the current DDM and the prior DDM to determine whether there is any change between the prior control data structure and the current control data structure, wherein the current control data structure is automatically generated in accordance with a determination that the prior control data structure and the current control data structure are distinct from one another.

17. The electronic device of claim 12, the one or more programs further comprising instructions for:
comparing the current DDM and the prior DDM to determine whether there is any change between the prior control data structure and the current control data structure, wherein automatically generating the current control data structure further includes, in accordance with a determination that there is no change between the prior control data structure and the current control data structure, associating the current DDM with the prior control data structure.

18. A non-transitory computer-readable storage medium, storing one or more programs comprising instructions, which when executed by one or more processors cause the one or more processors to perform operations comprising:
receiving a request to update a firmware program with a current version without receiving a current control data structure including control data used to maintain a state and operation of an electronic device including a memory device while the current version of the firmware program is executed;

automatically building the current control data structure while building a current version of a firmware program, including:

obtaining a current data descriptor map (DDM), wherein the current DDM maps a plurality of current data descriptors to a plurality of current locations in the current control data structure;

identifying, in the memory device, a prior DDM and a prior control data structure corresponding to a prior version of the firmware program, wherein the prior DDM maps a plurality of prior data descriptors to a plurality of prior locations in the prior control data structure, and the prior control data structure stores a plurality of prior control data items identified by the plurality of prior data descriptors; and translating the prior control data structure to the current control data structure corresponding to the current version of the firmware program based on the current DDM and the prior DDM, independently of building the current version of the firmware program, wherein the current control data structure stores a plurality of current control data items identified by the plurality of current data descriptors;

storing the current control data structure in the memory device; and implementing the current version of the firmware program on the electronic device using the plurality of current control data items stored in the current control data structure, without receiving the current control data structure jointly with the current version of the firmware program, thereby eliminating a need for overprovisioning data structures to accommodate revision rolls and conserving resources of a resource constrained embedded environment.

19. The non-transitory computer-readable storage medium of claim 18, wherein translating the prior control data structure to the current control data structure further comprising:

identifying a first data descriptor of a first control data item in both the current DDM and the prior DDM;

determining that the first data descriptor corresponds to a first current location in the current control data structure based on the current DDM;

determining that the first data descriptor corresponds to a first prior location in the prior control data structure based on the prior DDM; and copying the first control data item identified by the first data descriptor from the first prior location in the prior control data structure to the first current location in the current control data structure.

20. The non-transitory computer-readable storage medium of claim 18, wherein the firmware program includes a plurality of historic versions that are loaded before the current version, the one or more programs further comprising instructions for:

searching for a first data descriptor of a first control data item in a plurality of historic DDMs corresponding to the plurality of historic versions of the firmware program, starting from the most recent version, until the first data descriptor is identified in the prior DDM corresponding to the prior version of the firmware program.

\* \* \* \* \*